Figure 1:
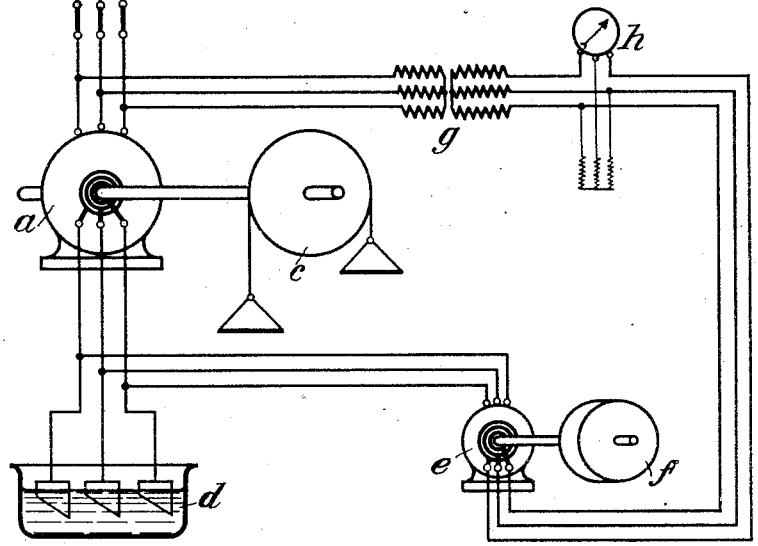

Dec. 4, 1923.

P. P. DEUTSCHMANN 1,476,059

METHOD OF ELECTRIC DRIVING

Filed Nov. 23, 1920  2 Sheets-Sheet 1

Inventor
Peter Paul Deutschmann
by Knight Bros
attorneys

Dec. 4, 1923.

P. P. DEUTSCHMANN

METHOD OF ELECTRIC DRIVING

Filed Nov. 23, 1920    2 Sheets-Sheet 2

Inventor
Peter Paul Deutschmann
by Knight Bro
Attorney

Patented Dec. 4, 1923.

1,476,059

UNITED STATES PATENT OFFICE.

PETER PAUL DEUTSCHMANN, OF BERLIN-CHARLOTTENBURG, GERMANY, ASSIGNOR TO SIEMENS-SCHUCKERTWERKE GESELLSCHAFT MIT BESCHRÄNKTER HAFTUNG, OF SIEMENSSTADT, NEAR BERLIN, GERMANY, A GERMAN CORPORATION.

METHOD OF ELECTRIC DRIVING.

Application filed November 23, 1920. Serial No. 426,082.

*To all whom it may concern:*

Be it known that I, PETER PAUL DEUTSCHMANN, a citizen of the German Empire, residing at Berlin-Charlottenburg, Germany, have invented certain new and useful Improvements in Methods of Electric Driving (for which I have filed an application in Germany, November 18, 1919), of which the following is a specification.

My invention relates to the driving of machinery of all sorts by means of electric motors and more especially asynchronous motors. In all cases in which, when starting electric motors, the load torque happens to be unknown while at the same time great masses are to be accelerated it will prove desirable to ascertain the degree of acceleration and retardation characteristic of the moving masses in order to be able to maintain a predetermined speed diagram so as to avoid objectionable accelerations or retardations of speed.

Such a case will occur, for instance in hoisting plants where the suspended load exerts a driving effect. In such a contingency in order to maintain a particular speed diagram it will be necessary to invariably secure the same degree of acceleration regardless of the direction in which the load moves and of the size thereof. Moreover, inadmissible accelerations or retardations of speed must be avoided for reasons of safety in order to exclude the possibility of dangerous strains or, in the case of rope pulleys, a slipping of the hoisting rope. In a like way in the working of railways, it will prove of advantage when encountering grades, and above all when braking on an incline, to be able to suitably estimate either the acceleration or the retardation. Such an estimate may be secured when employing the well-known Leonard system of driving by means of continuous-current because every position assumed by the control lever will practically always correspond to a particular rate of speed on the part of the driving motor. In all driving arrangements in the case of which resistances are interpolated into the main circuit for the purpose of starting, as for example in the case of asynchronous motors, however, this fact will no longer prove true. For in such cases the speed is no longer determined by the particular position of the starter, but is to a high degree dependent upon the size of the load and the direction in which it moves. Hence, any acceleration or retardation of the speed can no longer be estimated, and can therefore be controlled by the person attending to the plant only with the greatest difficulty. Nor will the knowledge of the current intensity or, in the case of asynchronous machines, of the energy absorption capacity provide any reliable indications as regards the accelerations or retardations liable to occur. The rate of current consumption will as a matter of fact merely afford an indication of the torque developed by the motor. The actual acceleration taking place during the starting period is, however, proportional to the difference prevailing between this torque of the motor and the torque of the load, so that it will either be smaller, equal to, or even greater than the acceleration produced by the motor current, according to whether the load to be hauled is a positive, a balanced, or a negative load. Again, where the brake must be applied to secure a retardation, this retardation will be greater, equal to or smaller than the retardation corresponding to the braking moment of the generator according to whether the load to be braked is a positive, a balanced or a negative one.

In accordance with my invention, use is made of the degree of energy absorption capacity and energy delivery capacity occurring in the case of an auxiliary asynchronous motor driving a rotating fly wheel mass, which motor is completely coupled electrically to the main motor for the purpose of ascertaining the actual acceleration and retardation prevailing in the case of asynchronous motors.

To this end, the windings of the stator and rotor of this auxiliary motor are suitably connected, say, crosswise, to the stator and rotor windings of the main motor. The tensions and frequencies arising at the auxiliary motor are the same, both in the stator as well as in the rotor, as those of the main motor. It therefore follows that within the limits set by the overloading capacity, this second motor must therefore follow exactly all the movements of the main motor. Now further considering that this auxiliary motor exclusively drives a fly wheel mass, every increase of speed when starting results in an energy absorption which merely corresponds to this acceleration. The watt components of the current absorbed by this auxiliary motor—after deducting a small portion required to cover natural losses—would thus serve as an indication for the acceleration of its mass. As, however, the auxiliary motor copies all the movements carried out by the main motor, the watt current absorbed by this auxiliary motor will likewise supply an indication of the actual acceleration effected by the main motor regardless of the direction of rotation and the size of the load carried by this motor, because the current intensity of the auxiliary motor is likewise independent thereof. Hence, the acceleration and retardation may be rendered visible by the simple introduction of a wattmeter, or, dispensing with absolute accuracy, of an amperemeter in that particular section of the auxiliary motor circuit fed with the frequency of the system.

In the drawings affixed to this specification and forming part thereof different systems of connection embodying my invention are illustrated diagrammatically by way of example. In the drawings—

Figure 2:
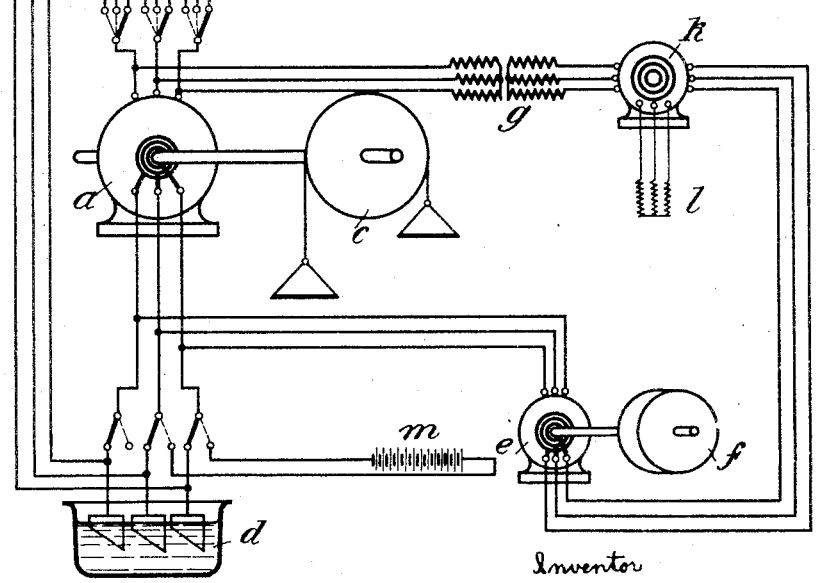
Figure 3:
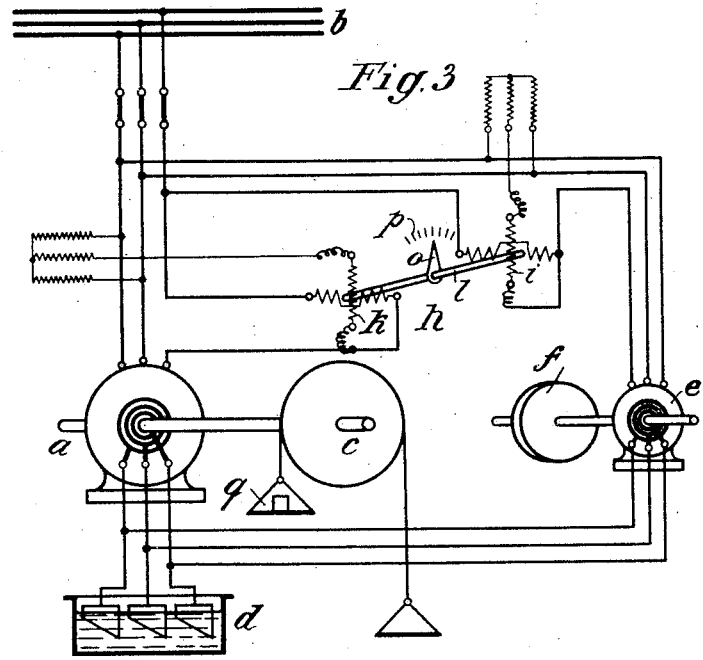
Figure 4:
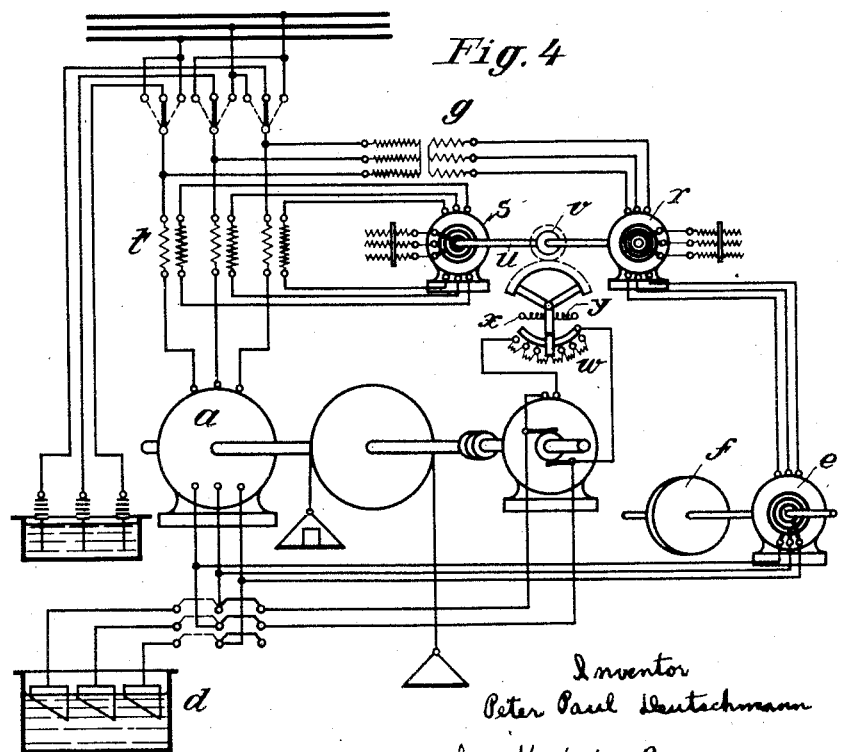

Fig. 1 discloses a system of connection for a hoisting plant embodying a wattmeter, Fig. 2 discloses a modification thereof embodying an asynchronous motor, Fig. 3 discloses another modification embodying an energy capacity meter, and Fig. 4 discloses a third modification embodying two asynchronous motors.

Referring to the drawings, $a$ is a three-phase asynchronous motor fed by the network $b$ and driving the rope-pulley $c$ of a hoisting plant. The speed of this motor is controlled by a resistance $d$. In accordance with my invention there is connected to the stator and rotor, respectively, of this motor, a supplementary, smaller asynchronous motor $e$ provided with a fly wheel mass $f$, a transformer $g$ being interpolated for the purpose of reducing the voltage prevailing intermediate the motor $e$ and the stator of the hoisting motor $a$. A wattmeter $h$ serves to measure the energy supplied to the auxiliary motor $e$, the position assumed by the index of this meter always indicating the acceleration effected by the hoisting motor and thus enabling this latter to be regulated by hand if necessary. However, the regulation of the acceleration in speed on the part of the hoisting motor may, if preferred, be arranged to take place automatically in any manner well known in the art. For example, if, instead of a simple wattmeter, use is made of a wattmeter relay adapted to act upon a servomotor which either alters the slip-resistance $d$ of the hoisting motor or else affects the freedom of motion of the control lever. The relay for its part operates whenever a definite degree of acceleration on the part of the hoisting machinery is not maintained. The degree of acceleration desired is set up on the wattmeter relay by changing the series resistance of the thin wire coil, the spring tensioning or else the position of the contact thereof. This adjustment and therewith the magnitude of the actual acceleration may, moreover, also be effected while the plant is in operation and in dependency upon the distance traversed by the load, say, for instance by interposing a cam disc operated by the depth indicator. In this case any desired speed diagram embodying a variable acceleration may be obtained entirely automatically.

However, in the place of a relay and a servo-motor, use may also be made in accordance with my invention of an asynchronous motor, having a non-interlinked stator winding, for the purpose of ascertaining and regulating the acceleration.

Fig. 2 illustrates this modified form of connection in which the asynchronous motor $k$ is connected in series with the auxiliary motor. This motor $k$ acts exactly in the same manner as a current transformer so that it fully corresponds in its action to a choking coil connected in series with the auxiliary motor. The torque of this series motor is intended to balance the mechanical torque affecting the control of the resistances or the position of the control lever and appertaining to a definite acceleration, that is to say, to a definite current intensity within the circuit of the auxiliary motor. The torque of the series motor required to this end depends, however, not only upon the current intensity but also upon the voltage consumed within the motor, which latter again is determined by the value of the rotor resistance $l$, so that it may be conveniently adjusted by merely altering this resistance $l$. In this case it will be found that for current intensities, and therefore also for accelerations, deviating from those in respect of which the apparatus was adjusted, the torque of the series motor—assuming the rotor resistance to have been left unaltered—will either exceed the torque of the regulating device or else be smaller.

If it be intended to have the series motor operate in conjunction with a different constant acceleration on the part of the main motor then either the mechanical torque, which strives to effect the displacement of the resistances or of the control lever, or else the torque developed by the series motor $k$ at a definite current intensity must be altered. This latter will be effected by simply varying the resistance $l$ interpolated in the rotor circuit.

It therefore follows that a change of the given acceleration may also be brought about by a simple variation of the resistance, so that in this case it becomes likewise possible to automatically start in accordance with any desired speed diagram. In addition, any possibility of excess regulation may be successfully avoided in the method of regulating the acceleration in accordance with my invention. Thus, for example, when employing the motor relay above described, use may be made to this particular end of the dependency of the series motor torque on the resistance, in so far as the latter, on the regulating motion being initiated, is automatically varied in accordance therewith.

However, the subject matter of my invention may likewise be made use of for the purpose of regulating the retardation when braking the main motor. Assume for instance that the main motor, when being brought to a stop and after disconnecting it from the network, is converted into the braking generator by exciting either its stator or rotor winding by a continuous-current, for example, by means of the battery $m$, disclosed in Fig. 2, and that correspondingly either its stator or rotor winding circuit is closed across brake resistances. In such an event, owing to the electrical connection established between the stator and rotor windings of the auxiliary motor and those of the main motor, the auxiliary motor will likewise come to be converted into a synchronous machine working in parallel with the main motor and possessing the same speed as this latter. As moreover the fly wheel mass of the auxiliary motor tends to maintain its motion, it follows that in retarding every reduction of speed is followed by a delivery of energy corresponding to the prevailing degree of the retardation. It will thus be seen that in this case the brake current generated constitutes an indication of the retardation actually taking place. As a result, even as in the previous case, the retardation may be indicated by the wattmeter or the amperemeter arranged in the circuit of the auxiliary motor. But also the automatic control of the retardation may be effected by allowing the control device—even as in the form of arrangement described hereinbefore—either to cause a release of the control lever or else to bring about a change of the brake resistances of the main motor.

By employing the acceleration control device in accordance with my invention there is, in addition, provided the possibility of devising methods of starting entirely automatically after the manner of push-button control devices. Thus, for example, in the case of a hoisting plant, it is only necessary to throw in the hoisting motor in the direction of rotation required, for the purpose of initiating the starting period, and to cause the torque of the regulating device—which is inert when the device is in a state of rest—to exert its influence. The actual starting is then effected automatically in accordance with the degree of acceleration determined in advance until the full driving speed has been attained, whereupon a special device provided cuts out the regulating device for the acceleration. For the purpose of stopping the motor by means of continuous-current excitation, the rotor is disconnected from the starting resistances by means of a stop arranged on the depth indicating device and applied to a source of continuous-current; at the same time the stator is disconnected from the network and closed across brake resistances. (In Fig. 2 it is shown as applied to the battery $m$.) If desired, the starting resistances may also be employed to act as brake resistances. However, in this contingency, as the braking current flows in a direction opposite to the acceleration current, it follows that each time the regulating device is released, the direction of rotation of this regulating device must be reversed either mechanically or electrically.

Again, bearing in mind that the auxiliary motor exactly imitates or copies the movements of the hoisting motor, it may at the same time be employed to drive either a tachometer or safety devices serving to prevent excessive speeds.

The improved auxiliary motor employed in accordance with the foregoing description for the purpose of determining the acceleration and retardation of asynchronous motors may, in accordance with my invention, be moreover made use of to ascertain the value and the direction of the load moment. This is of great importance in hoisting plants for the purpose of facilitating the control. If, for example, the man attending to the control be apprised by these means at the moment he brings the lever into the end position that there is present a heavy lowering load, he can obviously prevent the motor from running away by quickly placing the control lever, when speeding up, into the position in which the stator is short-circuited. In such a contingency, however, shocks and a slipping of the rope as a result of excess acceleration will hardly be avoidable.

But the knowledge of the value and direction of the moment of load, will also prove valuable if the asynchronous motor is converted into a synchronous generator by the supply of continuous-current, namely in order to be able to prevent the motor from exceeding the synchronous speed and to render it available for electrical retarding brake action. In the first-mentioned case it will be found advisable to cause the motor, reacting after the manner of a synchronous motor-generator, to return the energy to the network of the system without any phase-displacement. For this purpose, however, the excitation will be variable according to the load prevailing. If, therefore, this excitation is not proportional to the value of the load, there arises the possibility of the moment of load exceeding the synchronizing moment of the generator, and the generator will consequently tend to race. In the second case, dealing with braking by electric retardation the brake energy produced by the generator for one and the same braking distance will vary in value according to the value and the direction of the excess load to be braked. The brake energy furnished is dependent upon the value both of the brake resistance and of the excitation. Bearing in mind the fact that invariably work will be carried on at the same brake resistance which for its part is reduced by the control action so as to be always proportionate to the reduction in speed, it follows that in order to obtain the like slowing down curve in both instances, the intensity of the excitation will have to be adapted to the magnitude and direction of the load.

This value and direction of the excess load is ascertained and determined in accordance with my invention by determining the difference prevailing between the energy absorption of the auxiliary motor and that of the driving motor. The energy absorbed by the auxiliary motor when speeding up will correspond at all times to the difference prevailing between the torque $M_m$ of the driving motor and the load torque $M_q$ (Fig. 3) of this said motor. The energy absorbed by the driving motor from the network will be an indication of the torque $M_n$ which it develops. The difference between these two energies will consequently supply an indication for the load torque $M_q$. This latter may be ascertained, for example, by the currents, corresponding to the energies acting in opposite senses on the axis of rotation of an instrument, in which case they must be converted by the current converters, present in any case, into comparative values. The resulting torque coming to act upon the axis of rotation of the instrument will then be equal to the difference between the motor torque less the load turning moment, on the one hand, and the motor torque alone on the other hand, that is to say:—

$$(M_m - M_q) - M_m = -M_q$$

in the event of the load $q$ being a positive load. For a negative load the sign will be reversed. If the load be equal to zero, that is to say, in the event of the lowering and lifting loads being equal, then $M_q$ will likewise be equal to zero and the instrument will register no torque whatsoever. As a measuring instrument suitable for the purpose, use may be made of a wattmeter embodying two systems of coils, such as known and employed for measuring the energy of unequally loaded three-phase current networks. This instrument will at once indicate during the speeding up operation, the value and direction of an excess of load.

Fig. 3 illustrates a modification embodying this arrangement. The asynchronous motor $a$ driving the rope pulley $c$ is fed by the three-phase current network $b$, the speed of this motor being regulated by the resistance $d$. For the purpose of determining the value and direction of the excess of load $q$ the rotor and stator windings of the driving motor $a$ are connected to the stator and rotor windings of the auxiliary motor $e$ carrying the fly wheel mass $f$. In addition there is provided an energy meter having two coil systems $i$ and $k$ adapted to act upon a common axis $l$. One of these systems, i. e. $i$, is connected into the supply mains of the network running to the auxiliary motor, the other, i. e. $k$, is connected into the supply mains running to the driving motor. Both systems of coils are interconnected in such manner that the torques exerted by them on the shaft $l$ react upon each other. The difference of the torques, which is proportionate to the value of the load $q$, is indicated by the index $o$ upon the graduated scale $p$. The direction taken by the load is indicated by the direction in which the index moves. In accordance with the indication—and which remains constant for the entire duration of the starting period—the continuous-current exciting voltage (see Fig. 2) corresponding to the load counterbalanced must be reduced when the index moves in the direction of the driven load and inversely it must be increased when the index moves in the direction of the driving load. This adjustment of the exciting voltage may be effected by hand or else automatically by aid of a servo-motor.

However, for the purpose of automatically regulating the continuous-current exciting voltage, use may also be made of two asynchronous motors $r$ and $s$, as disclosed in Fig. 4. One of these motors, i. e. $r$, is connected in series with the particular part of the auxiliary motor which is fed by the network $b$ across the transformer $g$, whereas the other, i. e. $s$, is connected in series with the stator of the hoisting motor $a$ through a current converter $t$. Both these motors counteract each other on a shaft $u$ on which is mounted a toothed wheel $v$ adapted to displace the regulating resistance $w$ for the continuous-current excitation supplied by a continuous current generator $n$. Whenever the hoisting motor lifts a positive load then the torque of the relay motor, with which it is connected, will prevail, and will effect a variation in the adjustment of the excitation until this excess torque is neutralized by the counter torque of a spring $x$ tensioned when the regulating resistance is shifted out of its central position. If, on the other hand, there happens to be present a driving load, then the torque of that relay motor will prevail, which is connected to the auxiliary motor. This torque brings about a variation of the excitation in the counter sense, until it is counter-balanced by means of a spring *y* which is tensioned in proportion to the displacement of the regulating resistance. The neutralizing of the torques relatively to each other, and relatively to the counter torque created by the springs, is effected by simply varying the rotor resistances within the two relay motors.

I claim:

1. In an electric drive fed by a supply line the combination of an asynchronous driving motor with an auxiliary asynchronous motor having a fly wheel mechanically coupled to it, electrical stator and rotor connections between said driving motor and said auxiliary motor independent of said line, and means included in said connections for indicating the rate of acceleration or retardation of the driving motor.

2. In an electric drive fed by a supply line the combination of an asynchronous driving motor with an auxiliary asynchronous motor having a fly wheel mechanically coupled to it, electrical stator and rotor connections between said driving motor and said auxiliary motor independent of said line, and means included in said connections for indicating the rate of acceleration or retardation of the driving motor, said means comprising an indicator operating in accordance with the energy supplied to or delivered by said auxiliary motor.

3. In an electric drive fed by a supply line the combination of an asynchronous driving motor with an auxiliary asynchronous motor having a fly wheel mechanically coupled to it, electrical stator and rotor connections between said driving motor and said auxiliary motor independent of said line, and means included in said connections for indicating the rate of acceleration or retardation of the driving motor, said means comprising an indicator operating in accordance with the energy supplied to or delivered by said auxiliary motor, said indicator being adapted to automatically regulate the degree of acceleration or retardation of said driving motor.

4. In an electric drive fed by a supply line the combination of an asynchronous driving motor with an auxiliary asynchronous motor having a fly wheel mechanically coupled to it, electrical stator and rotor connections between said driving motor and said auxiliary motor independent of said line, and means included in said connections for indicating the rate of acceleration or retardation of the driving motor, said means comprising a controlling asynchronous motor connected in series with said auxiliary motor and operating in accordance with the energy supplied to or delivered by said auxiliary motor to control the degree of acceleration or retardation of said driving motor.

5. In an electric drive fed by a supply line the combination of an asynchronous driving motor with an auxiliary asynchronous motor having a fly wheel mechanically coupled to it, electrical stator and rotor connections between said driving motor and said auxiliary motor independent of said line, and means included in said connections for indicating the rate of acceleration or retardation of the driving motor, said means comprising a controlling asynchronous motor connected in series with said auxiliary motor and operating in accordance with the energy supplied to or delivered by said auxiliary motor to control the degree of acceleration or retardation of said driving motor, and an adjustable resistance in the rotor of said controlling motor for adjusting the controlling effect of said control motor.

6. In an electric drive fed by a supply line the combination of an asynchronous driving motor with an auxiliary asynchronous motor having a fly wheel mechanically coupled to it, electrical stator and rotor connections between said driving motor and said auxiliary motor independent of said line and means included in said electrical connections responsive to the energy absorption of said driving motor and of said auxiliary motor and adapted to indicate the amount and the direction of the excess load put on said driving motor.

7. In an electric drive fed by a supply line the combination of an asynchronous driving motor with an auxiliary asynchronous motor having a fly wheel mechanically coupled to it, electrical stator and rotor connections between said driving motor and said auxiliary motor independent of said line and controlling means included in said electrical connections responsive to the energy absorption of said driving motor and of said auxiliary motor and adapted to indicate the amount and the direction of the excess load put on said driving motor, and means for operating said driving motor in accordance with the response of said controlling means.

In testimony whereof I affix my signature.

PETER PAUL DEUTSCHMANN.